United States Patent
Zer et al.

(10) Patent No.: US 10,185,109 B2
(45) Date of Patent: Jan. 22, 2019

(54) MODULAR SYSTEM FOR DATACENTER SWITCH SYSTEMS AND ROUTERS

(71) Applicant: Mellanox Technologies, Ltd., Yokneam (IL)

(72) Inventors: Yoram Zer, Yokneam (IL); Pierre Avner Badehi, Yehuda (IL); Avi Gibbs, Rehovot (IL); Marc Dahan, Haifa (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 15/394,005

(22) Filed: Dec. 29, 2016

(65) Prior Publication Data

US 2018/0188465 A1 Jul. 5, 2018

(51) Int. Cl.
*G02B 6/44* (2006.01)
*H04Q 11/00* (2006.01)
*G02B 6/38* (2006.01)

(52) U.S. Cl.
CPC ......... *G02B 6/4441* (2013.01); *G02B 6/3897* (2013.01); *G02B 6/4452* (2013.01); *H04Q 11/0071* (2013.01)

(58) Field of Classification Search
CPC .. G02B 6/4441; G02B 6/3897; G02B 6/4452; H04Q 11/0071
See application file for complete search history.

(56) References Cited

U.S. PATENT DOCUMENTS

| | | | | | |
|---|---|---|---|---|---|
| 2,022,385 | A | * | 11/1935 | Pasinski | G07G 1/0027 235/22 |
| 2,070,064 | A | * | 2/1937 | Pasinski | G07G 1/0027 235/22 |
| 2,156,874 | A | * | 5/1939 | Schonitzer | E05B 85/045 16/85 |
| 3,371,947 | A | * | 3/1968 | Gridley | E05B 63/127 292/108 |
| 3,531,174 | A | * | 9/1970 | Poe | E05B 65/46 292/113 |
| 4,603,239 | A | * | 7/1986 | Ishii | E05B 17/22 200/61.61 |
| 4,895,008 | A | * | 1/1990 | Blake | E05B 47/0607 109/47 |
| 4,975,805 | A | * | 12/1990 | Schmutzler | H05K 5/0295 360/99.02 |
| 4,995,821 | A | * | 2/1991 | Casey | H01R 13/518 439/157 |
| 5,868,261 | A | * | 2/1999 | Collins | G11B 33/125 211/26 |

(Continued)

*Primary Examiner* — Peter Radkowski
(74) *Attorney, Agent, or Firm* — Alston & Bird LLP

(57) ABSTRACT

Networking systems and methods of assembly are described that provide a modular system that includes a main networking box and a detachable module. The main networking box and the detachable module are configured to be connected to each other on a datacenter rack via board-to-board connectors to provide the desired connections to the network, but can also be unlocked and detached from each other, such as to allow the main networking box to be replaced. In this way, the main networking box can be replaced in the field to provide a repair, or the detachable module can be replaced to provide a different connection type, without requiring the other component and/or its connections to be disturbed.

20 Claims, 11 Drawing Sheets

(56) References Cited

U.S. PATENT DOCUMENTS

| | | | | |
|---|---|---|---|---|
| 5,896,485 A * | 4/1999 | Kirby | G02B 6/3897 | 385/134 |
| 6,288,902 B1 * | 9/2001 | Kim | G11B 33/08 | 206/701 |
| 6,609,838 B1 * | 8/2003 | Branch | G02B 6/4246 | 361/752 |
| 6,618,256 B1 * | 9/2003 | Bovio | G06F 1/184 | 361/724 |
| 6,692,159 B2 * | 2/2004 | Chiu | G02B 6/3825 | 385/53 |
| 6,796,715 B2 * | 9/2004 | Chiu | G02B 6/3825 | 385/134 |
| 6,811,317 B2 * | 11/2004 | Chiu | G02B 6/3825 | 385/53 |
| 6,814,502 B2 * | 11/2004 | Chiu | G02B 6/3825 | 385/53 |
| 6,832,856 B2 * | 12/2004 | Chiu | G02B 6/3825 | 385/139 |
| 6,846,114 B2 * | 1/2005 | Chiu | G02B 6/3825 | 385/134 |
| 6,848,759 B2 * | 2/2005 | Doornbos | E05F 1/16 | 16/64 |
| 6,883,971 B2 * | 4/2005 | Chiu | G02B 6/3825 | 385/53 |
| 6,943,854 B2 * | 9/2005 | Chiu | G02B 6/3825 | 349/53 |
| 6,974,265 B2 * | 12/2005 | Chiu | G02B 6/3825 | 385/53 |
| 7,354,204 B2 * | 4/2008 | Adams | G02B 6/4201 | 385/88 |
| 7,537,476 B1 * | 5/2009 | McColloch | G02B 6/4201 | 439/157 |
| 7,621,679 B2 * | 11/2009 | Oki | G02B 6/4201 | 385/89 |
| 7,945,135 B2 * | 5/2011 | Cooke | G02B 6/4455 | 385/135 |
| 8,083,304 B2 * | 12/2011 | Hu | A47B 88/467 | 312/319.1 |
| 8,195,017 B2 * | 6/2012 | Kaneshiro | G02B 6/4201 | 385/14 |
| 8,277,002 B2 * | 10/2012 | Perez | A47B 88/467 | 312/333 |
| 8,328,299 B2 * | 12/2012 | Hashemi | E05B 47/00 | 312/319.5 |
| 8,588,561 B2 * | 11/2013 | Zbinden | G02B 6/4232 | 385/14 |
| 8,588,562 B2 * | 11/2013 | Zbinden | G02B 6/4232 | 385/14 |
| 8,787,711 B2 * | 7/2014 | Zbinden | G02B 6/4232 | 385/14 |
| 8,923,013 B2 * | 12/2014 | Anderson | G02B 6/4452 | 361/728 |
| 9,200,475 B2 * | 12/2015 | Gallo | E05B 47/023 | |
| 9,354,404 B2 * | 5/2016 | Qi | G02B 6/428 | |
| 9,374,165 B2 * | 6/2016 | Zbinden | G02B 6/4232 | |
| 9,458,647 B2 * | 10/2016 | Gartner | E05B 17/2092 | |
| 9,599,772 B2 * | 3/2017 | Qi | G02B 6/428 | |
| 2002/0150343 A1 * | 10/2002 | Chiu | G02B 6/3825 | 385/53 |
| 2002/0150344 A1 * | 10/2002 | Chiu | G02B 6/3825 | 385/53 |
| 2003/0059167 A1 * | 3/2003 | Chiu | G02B 6/3825 | 385/53 |
| 2003/0133665 A1 * | 7/2003 | Chiu | G02B 6/3825 | 385/53 |
| 2003/0133666 A1 * | 7/2003 | Chiu | G02B 6/3825 | 385/53 |
| 2003/0133667 A1 * | 7/2003 | Chiu | G02B 6/3825 | 385/53 |
| 2004/0047564 A1 * | 3/2004 | Chiu | G02B 6/3825 | 385/53 |
| 2004/0161207 A1 * | 8/2004 | Chiu | G02B 6/3825 | 385/88 |
| 2005/0013548 A1 * | 1/2005 | Chiu | G02B 6/3825 | 385/53 |
| 2005/0117854 A1 * | 6/2005 | Chiu | G02B 6/3825 | 385/92 |
| 2007/0042631 A1 * | 2/2007 | Chen | G02B 6/3897 | 439/372 |
| 2007/0147746 A1 * | 6/2007 | Adams | G02B 6/4201 | 385/92 |
| 2007/0149028 A1 * | 6/2007 | Yu | G02B 6/4292 | 439/352 |
| 2007/0232146 A1 * | 10/2007 | Yamakami | H01R 13/741 | 439/638 |
| 2007/0253175 A1 * | 11/2007 | Adams | G02B 6/4201 | 361/747 |
| 2008/0080825 A1 * | 4/2008 | Leon | G02B 6/4452 | 385/135 |
| 2009/0021129 A1 * | 1/2009 | Hu | A47B 88/467 | 312/333 |
| 2009/0034915 A1 * | 2/2009 | Oki | G02B 6/4201 | 385/92 |
| 2010/0054685 A1 * | 3/2010 | Cooke | G02B 6/4455 | 385/135 |
| 2010/0150518 A1 * | 6/2010 | Leon | G02B 6/4452 | 385/135 |
| 2010/0176700 A1 * | 7/2010 | Perez | A47B 88/467 | 312/334.8 |
| 2010/0322580 A1 * | 12/2010 | Beamon | G02B 6/4452 | 385/135 |
| 2011/0069914 A1 * | 3/2011 | Hashemi | E05B 47/00 | 384/21 |
| 2011/0267794 A1 * | 11/2011 | Anderson | G02B 6/4452 | 361/810 |
| 2011/0293221 A1 * | 12/2011 | Kaneshiro | G02B 6/4201 | 385/49 |
| 2013/0004120 A1 * | 1/2013 | Zbinden | G02B 6/4232 | 385/14 |
| 2013/0028544 A1 * | 1/2013 | Lowe | A47B 88/047 | 384/21 |
| 2013/0069514 A1 * | 3/2013 | Hashemi | E05B 47/00 | 312/333 |
| 2013/0148973 A1 * | 6/2013 | Zbinden | G02B 6/4232 | 398/115 |
| 2013/0181588 A1 * | 7/2013 | Hashemi | E05B 47/00 | 312/319.1 |
| 2013/0236186 A1 * | 9/2013 | Zbinden | G02B 6/4232 | 398/115 |
| 2013/0287324 A1 * | 10/2013 | Nuckolls | A47B 88/463 | 384/18 |
| 2014/0021843 A1 * | 1/2014 | Hashemi | E05B 47/0001 | 312/333 |
| 2014/0084769 A1 * | 3/2014 | Lowe | A47B 88/047 | 312/319.1 |
| 2014/0185988 A1 * | 7/2014 | Qi | G02B 6/428 | 385/77 |
| 2014/0286646 A1 * | 9/2014 | Zbinden | G02B 6/4232 | 398/135 |
| 2015/0091424 A1 * | 4/2015 | Nuckolls | A47B 88/463 | 312/319.1 |
| 2015/0115629 A1 * | 4/2015 | Gartner | E05B 17/2092 | 292/220 |
| 2015/0159412 A1 * | 6/2015 | Seitz | H05K 7/1409 | 292/128 |
| 2016/0130840 A1 * | 5/2016 | Garneau | E05B 47/0012 | 292/201 |
| 2016/0266323 A1 * | 9/2016 | Qi | G02B 6/428 | |
| 2016/0269118 A1 * | 9/2016 | Zbinden | G02B 6/4232 | |
| 2016/0291274 A1 * | 10/2016 | Zbinden | G02B 6/4232 | |
| 2016/0327760 A1 * | 11/2016 | Zbinden | G02B 6/4232 | |
| 2016/0327761 A1 * | 11/2016 | Zbinden | G02B 6/4232 | |

* cited by examiner

MODULAR SYSTEM FOR DATACENTER SWITCH SYSTEMS AND ROUTERS

BACKGROUND

The present disclosure relates in general to datacenter switch systems and routers with modular components. In particular, switch systems and routers having modular components are described that are configured to be separated from each other for replacement in the field without disruption of the other component.

Datacenter switch systems and routers generally include connections to other switch systems, routers, servers, and devices. Such connections can be made using cables and interconnects, which can have different connector types.

Often, equipment in the datacenter needs to be replaced, such as due to failure of a component or system, or due to desired upgrades or changes.

BRIEF SUMMARY

According to conventional methods, the replacement of equipment in a datacenter is cumbersome and time consuming. For example, the replacement of a conventional switch system or router that is deployed and in use in a datacenter typically requires the disconnection of cables and connections to allow the switch system or router to be removed and replaced with a new switch system or router. The new switch system or router must then be re-connected to the cables and connections to bring the new device on-line.

Accordingly, embodiments of a modular system are described in which a main switch box and a detachable module are provided. Embodiments of the detachable module are configured to be connected to the main switch box to provide the desired connections to the network, but can also be unlocked and detached from the main switch box to enable the main switch box or the detachable module to be replaced. In this way, for example, the main switch box can be replaced to provide a repair, or the detachable module can be replaced to provide for different connection types, without requiring the other component and/or its connections to be disturbed.

In some embodiments, a networking system configured to be received by a datacenter rack is provided. The networking system is configured to allow conversion between optical signals and electrical signals and comprises a main networking box and a detachable module. The main networking box comprises a printed circuit board assembly disposed within the main networking box and one or more board-to-board connectors disposed at an end of the main networking box. The detachable module comprises one or more connectors disposed at a first end of the detachable module and configured to receive an optical cable, wherein the optical cable is configured to transmit an optical signal. The detachable module further comprises one or more board-to-board connectors disposed at a second end of the detachable module and configured to engage the board-to-board connectors of the main networking box to enable electrical signals to be transmitted between the detachable module and the printed circuit board assembly of the main networking box.

One of the main networking box and the detachable module further comprises a latching mechanism and the other of the main networking box and the detachable module further comprises an engagement member configured to be engaged by the latching mechanism. In a locked state, the latching mechanism and the engagement member are engaged, and the detachable module is secured to the main networking box, such that the board-to-board connectors of the detachable module are connected to the board-to-board connectors of the main networking box to enable the electrical signals to pass therebetween. In an unlocked state, the latching mechanism and the engagement member are disengaged, and the detachable module and the main networking box are movable with respect to each other, so as to allow removal of one of the main networking box or the detachable module from the datacenter rack.

In some cases, in the unlocked state, the main switch box is removable from the datacenter rack without rewiring the detachable module.

The latching mechanism may be disposed on the main networking box, and the engagement member may be disposed on the detachable module. The latching mechanism may comprise an actuator configured to be actuated by a user to change between the locked state and the unlocked state. The latching mechanism may further comprise a latching arm rotatably attached to the main networking box, and the engagement member may comprise a pin attached to the detachable module proximate the second end of the detachable module, wherein the latching arm is configured to engage the pin of the detachable module to secure the detachable module to the main networking box in the locked state.

In some cases, each of the main networking box and the detachable module comprises a support feature configured to mate with a corresponding support feature of the datacenter rack.

The optical cable may, in some cases, further comprises an active optical cable configured to convert between optical signals and electrical signals. Moreover, the one or more connectors disposed on the first end of the detachable module may be configured to receive quad small form-factor pluggable (QSFP), quad small form-factor pluggable double density (QSFP-DD), micro QSFP, small form-factor pluggable (SFP), C form-factor pluggable (CFP), and/or registered jack (RJ45) active optical cable connections.

In other embodiments, a method of assembling a networking system configured to be received by a datacenter rack is provided. The networking system is configured to allow conversion between optical signals and electrical signals, and the method comprises constructing a main networking box. The main networking box comprises a printed circuit board assembly disposed within the main networking box, and one or more board-to-board connectors disposed at an end of the main networking box. The method further comprises constructing a detachable module, wherein the detachable module comprises one or more connectors disposed at a first end of the detachable module and configured to receive an optical cable, wherein the optical cable is configured to transmit an optical signal, and the detachable module further comprises one or more board-to-board connectors disposed at a second end of the detachable module and configured to engage the board-to-board connectors of the main networking box to enable electrical signals to be transmitted between the detachable module and the printed circuit board assembly of the main networking box.

Constructing one of the main networking box and the detachable module further comprises providing a latching mechanism, and constructing the other of the main networking box and the detachable module further comprises providing an engagement member configured to be engaged by the latching mechanism. In a locked state, the latching mechanism and the engagement member are engaged, and the detachable module is secured to the main networking box, such that the board-to-board connectors of the detachable module are connected to the board-to-board connectors of the main networking box to enable the electrical signals to pass therebetween. In an unlocked state, the latching mechanism and the engagement member are disengaged, and the detachable module and the main networking box are movable with respect to each other, so as to allow removal of one of the main networking box or the detachable module from the datacenter rack.

In some cases, in the unlocked state, the main networking box is removable from the datacenter rack without rewiring the detachable module.

In some embodiments, constructing the main networking box comprises disposing the latching mechanism on the main networking box, and constructing the detachable module comprises disposing the engagement member on the detachable module. The latching mechanism may comprise an actuator configured to be actuated by a user to change between the locked state and the unlocked state. The latching mechanism may further comprise a latching arm rotatably attached to the main networking box, and the engagement member may comprise a pin attached to the detachable module proximate the second end of the detachable module, wherein the latching arm is configured to engage the pin of the detachable module to secure the detachable module to the main networking box in the locked state.

In some cases, each of constructing the main networking box and constructing the detachable module may comprise attaching a support feature to each side panel of the main networking box and detachable module that is configured to mate with a corresponding support feature of the datacenter rack.

The optical cable may further comprise an active optical cable configured to convert between optical signals and electrical signals. Moreover, the one or more connectors disposed on the first end of the detachable module may be configured to receive quad small form-factor pluggable (QSFP), quad small form-factor pluggable double density (QSFP-DD), micro QSFP, small form-factor pluggable (SFP), C form-factor pluggable (CFP), and/or registered jack (RJ45) active optical cable connections.

In still other embodiments, a networking system configured to be received by a datacenter rack is provided. The networking system is configured to allow conversion between optical signals and electrical signals and comprises a main networking box comprising a printed circuit board assembly disposed within the main networking box, and one or more board-to-board connectors disposed at an end of the main networking box. The networking system further comprises a detachable module comprising one or more connectors disposed at a first end of the detachable module and configured to receive an optical cable, wherein the optical cable is configured to transmit an optical signal, and one or more board-to-board connectors disposed at a second end of the detachable module and configured to engage the board-to-board connectors of the main networking box to enable electrical signals to be transmitted between the detachable module and the printed circuit board assembly of the main networking box.

The main networking box comprises a latching member that includes a latching arm, and the detachable module comprises an engagement member defined by a pin. The latching arm of the latching mechanism of the main networking box is configured to be moved into engagement with the pin of the detachable module to secure the detachable module to the main networking box, thereby connecting the board-to-board connectors of the detachable module to the board-to-board connectors of the main networking box to enable the electrical signals to pass therebetween. The latching arm of the latching mechanism of the main networking box is configured to be moved out of engagement with the pin of the detachable module to allow the main networking box to be separated from the detachable module and removed from the datacenter rack.

In some cases, the latching mechanism may comprise an actuator configured to be actuated by a user to move the latching arm into and out of engagement with the pin. Each of the main networking box and the detachable module may comprise a support feature configured to mate with a corresponding support feature of the datacenter rack. The support feature of the main networking box and the detachable module may comprise first and second rail portions, and the corresponding support feature of the datacenter rack may comprise a channel guide configured to slideably receive the first and second rail portions therein.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

Figure 1:
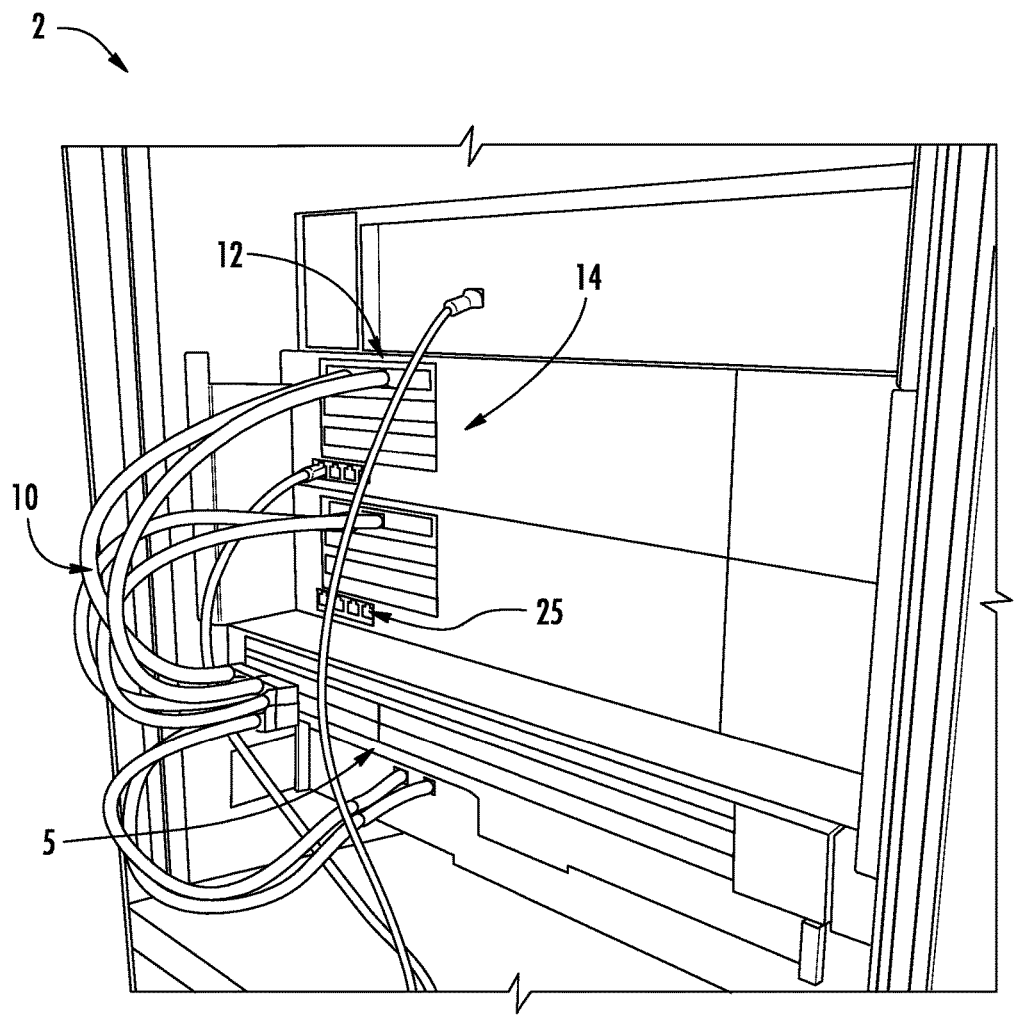
FIG. 1 is a front perspective view of a rack of switch systems and/or routers in a datacenter according to an example embodiment.

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Accordingly, as an example, the term "front panel" may be used to describe a panel; however, the panel may be in the front or in the rear, depending on the orientation of the particular item being described. Moreover, although the example of a modular switch system is used herein and in the figures for ease of explanation, it is understood in light of this disclosure that embodiments of the modular system described herein are also applicable to routers to provide for a modular router system. Accordingly, the terms "networking system" and "networking box" as used herein are understood to encompass switch and router systems and switch and router boxes, respectively.

Extensive growth in global internet traffic due to increasing demands for high-definition video and high-speed broadband penetration has required new hardware that allows for higher data transmission rates in datacenters. A conventional datacenter rack 2, or cabinet that is designed to house servers, networking devices, and other datacenter computing equipment, is depicted in FIG. 1 from a front side of the datacenter rack.

Traditionally, copper is used as the transmission medium for electrical signals in main networking cables. While copper is relatively cost effective with well-controlled electrical and mechanical parameters, optical transmission systems often provide cheaper and more reliable networking systems. Optical fiber, for example, offers enhanced capacity (e.g., greater bandwidth) over distance, increased bandwidth density, greater security and flexibility, and lower costs as compared to metal cables.

Various different types of connectors exist for enabling transmission of signals (optical and/or electrical) between switch boxes and other equipment in a datacenter. For example, Quad Small Form-factor Pluggable (QSFP) connectors and cables, as well as other forms of connectors such as Small Form Pluggable (SFP) and C-Form-factor Pluggable (CFP) connectors, have long been the industry standard for providing high-speed information operations interface interconnects. More recently, Octal Small Form-factor Pluggable (OSFP) transceivers have come about to provide increased bit rate capabilities of up to 400 Gbps. Regardless of the type of connector, these transceivers interface a switch system board, such as a motherboard in a switch system, to a fiber optic or copper networking cable, such as by making connections between switch system boxes 5 as shown in FIG. 1.

With continued reference to FIG. 1, for example, a switch system box 5, which may house an application-specific integrated circuit (ASIC) as well as other internal components (not visible), is typically incorporated into a datacenter network via connections to other switch systems, routers, servers, and network components. A switch system box 5 may, for example, interact with other components of the datacenter via external networking cables 10 and transceivers 12. These networking cables 10 and transceivers 12 may connect to the switch system box 5 and the other components of the datacenter network via external connectors 25 of the switch system box 5.

As illustrated in FIG. 1, the networking of conventional switch system boxes 5 requires connections to be made via a number of networking cables 10. As such, replacing a switch system box 5 that is deployed in a datacenter rack 2 requires that all of the cables 10 be disconnected from the switch panel 14 so that the user is able to remove the switch system box 5 from the rack. This is typically a time consuming and labor intensive process. In addition, once the replacement switch system box 5 is introduced to the rack 2, it is necessary for the user to reconnect the cables 10 to the correct ports of the switch panel 14 for proper networking of the replacement switch system box. The process of reconnecting the replacement switch system box 5 can also be time consuming and laborious, and any mistakes made in the reconnections (e.g., connecting a cable 10 to the wrong port) can cause errors in the networking.

Switch system boxes 5 may need to be replaced in cases where there is a failure in a component of the box and the box needs to be repaired or exchanged for a new box. In addition, conventional switch systems are typically designed with a predefined connector selection for the external ports, such that only certain connector types can be accommodated, and only a certain number of those connectors can be received. As advances are made and new types of connectors are introduced, or as new demands are placed on the conventional switch system that require additional connections to be made, a different switch system box may be required that has the correct capabilities (e.g., port configuration) to accommodate a different configuration of connectors.

Accordingly, embodiments of the invention described herein provide a modular networking system, where the networking system includes multiple components that can be separated from each other and replaced in the field without disturbing the other component to reduce the time and effort required to make field replacements of equipment, as well as to provide a greater amount of flexibility with respect to the connector types and quantities that can be accommodated, now and in the future.

Figure 2:
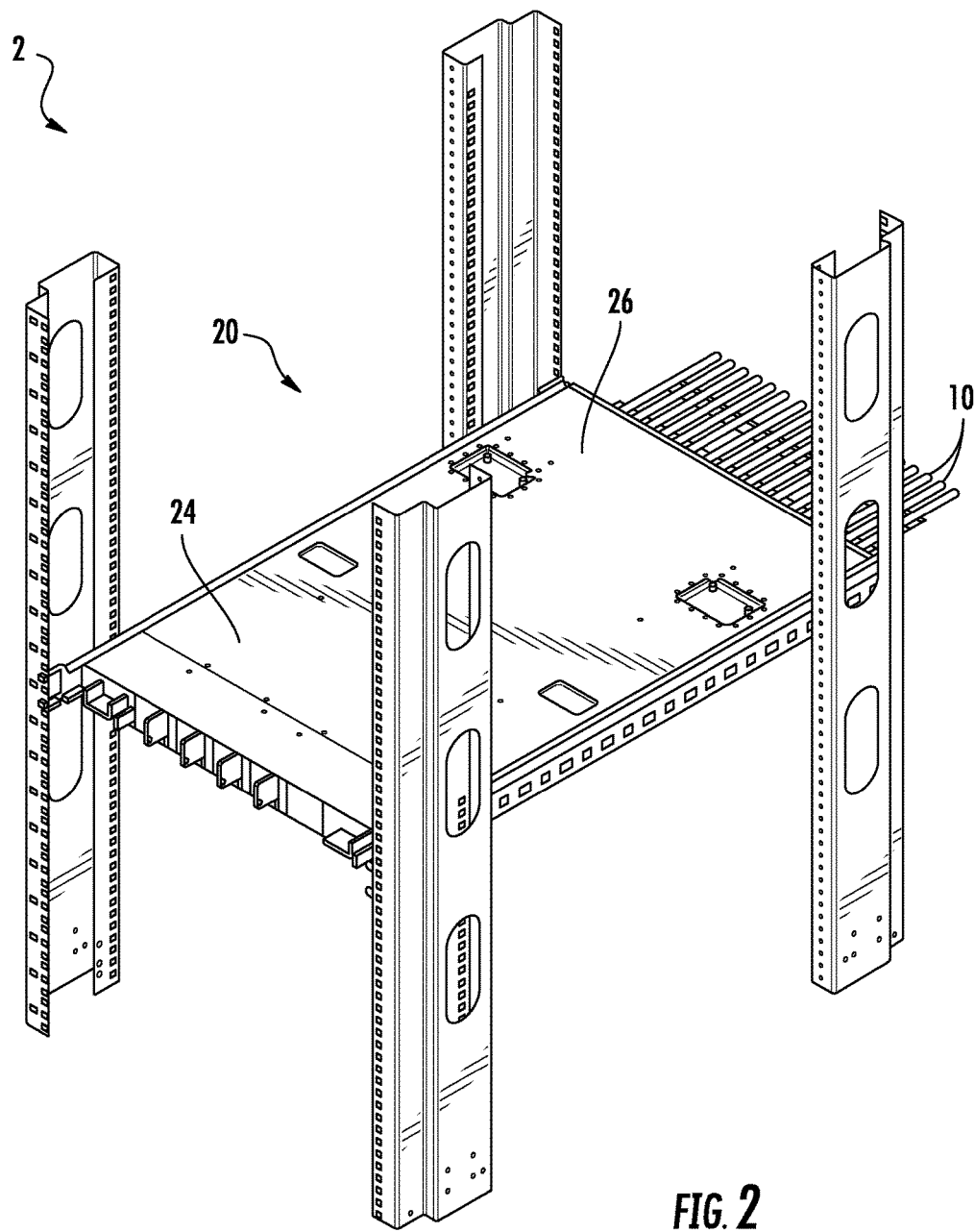
FIG. 2 is a rear perspective view of a switch system on a rack according to an example embodiment.
Figure 3:
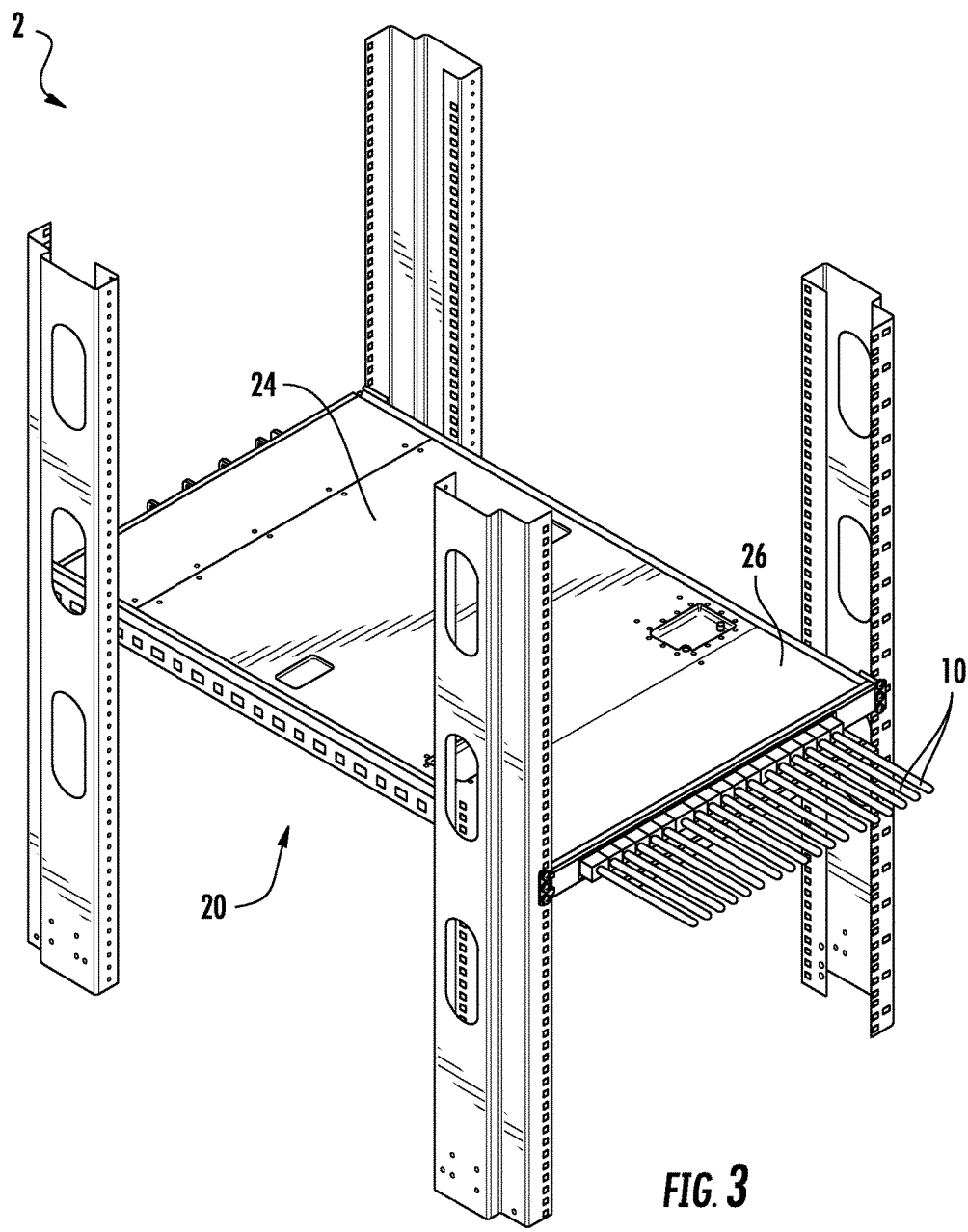
FIG. 3 is a front perspective view of a switch system secured on a rack according to an example embodiment.

With reference to FIGS. 2 and 3, a simplified illustration of a rack 2 with a switch system 20 is depicted for the purpose of explanation. It is noted that a rack 2 may have multiple switch systems 20 installed, such as stacked one above the other, to allow for additional processing capability. Moreover, additional components, connections, and devices may be included as part of the switch system 20 that are not illustrated for purposes of explanation.

The switch system 20 may be configured to be received by a datacenter rack 2 such as the one shown in FIGS. 2 and 3 and may be configured to allow for the conversion between optical signals and electrical signals. For example, optical cables 10 may carry optical signals as inputs to the switch system 20. The optical signals may be converted to electrical signals via an opto-electronic transceiver, which may form part of the optical cable 10 in cases in which the optical cable 10 is an Active Optical Cable (AOC), such as a cable that includes a QSFP connector that is received by a port of the switch system 20. In other cases, the optical cable 10 may be passive, and the switch system 20 may include opto-electronic components that convert between optical signals and electrical signals. The electrical signals may then be processed by the switch system 20 and/or routed to other computing devices, such as servers and devices on other racks or at other datacenters via other components and cables (not shown). In addition, electrical signals received from other networking devices (e.g., from other datacenters, racks, etc.) may be processed by the switch system 20 and then converted into corresponding optical signals to be transmitted via the optical cables 10, going the opposite direction.

Figure 4:
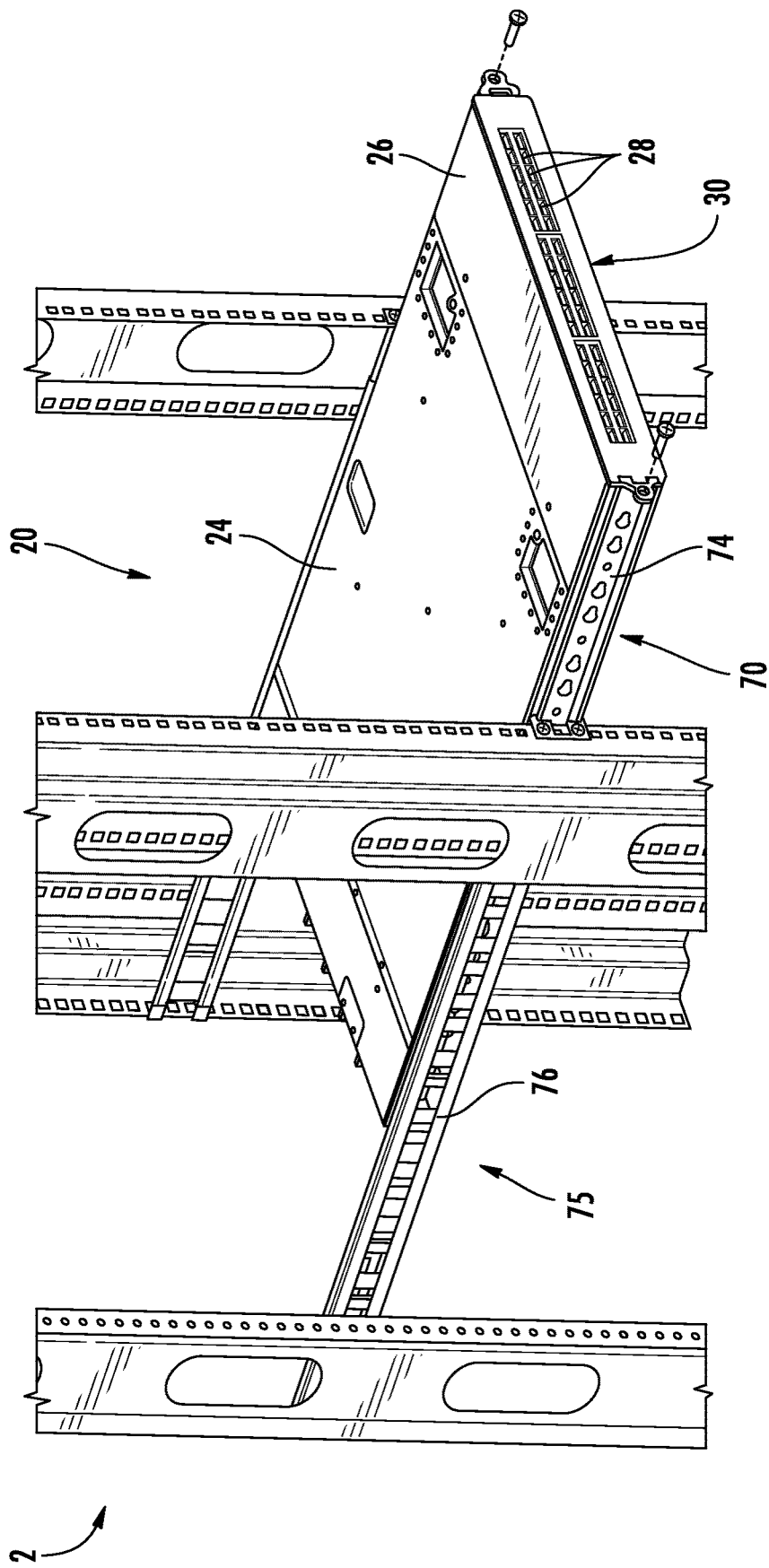
FIG. 4 is a front perspective view of a main switch box and a detachable module in the locked state and pulled out of the rack according to an example embodiment.

Referring now to FIG. 4, which shows the switch system 20 pulled out of the rack 2, embodiments of the switch system 20 include a main switch box 24 and a detachable module 26. In some cases, the switch system 20 may be thought of as being separated into two parts. The main switch box 24 may include all of the integral parts of the switch system 20, such as one or more printed circuit board assemblies (e.g., a CPU or motherboard) for processing signals. The main switch box 24 may further include one or more Field Replaceable Units (FRUs), including components such as fans, power supplies, and so on. The detachable module 26, in turn, may be a front panel module of the switch system 20. The detachable module 26 may, in some cases, be designed as an FRU and/or may comprise one or more connectors 28 disposed at a first end 30 of the detachable module, as shown in FIG. 4. The connectors 28 may be configured to receive optical cables 10 (shown in FIG. 3), where the optical cables are configured to transmit optical signals as described above.

Figure 5:
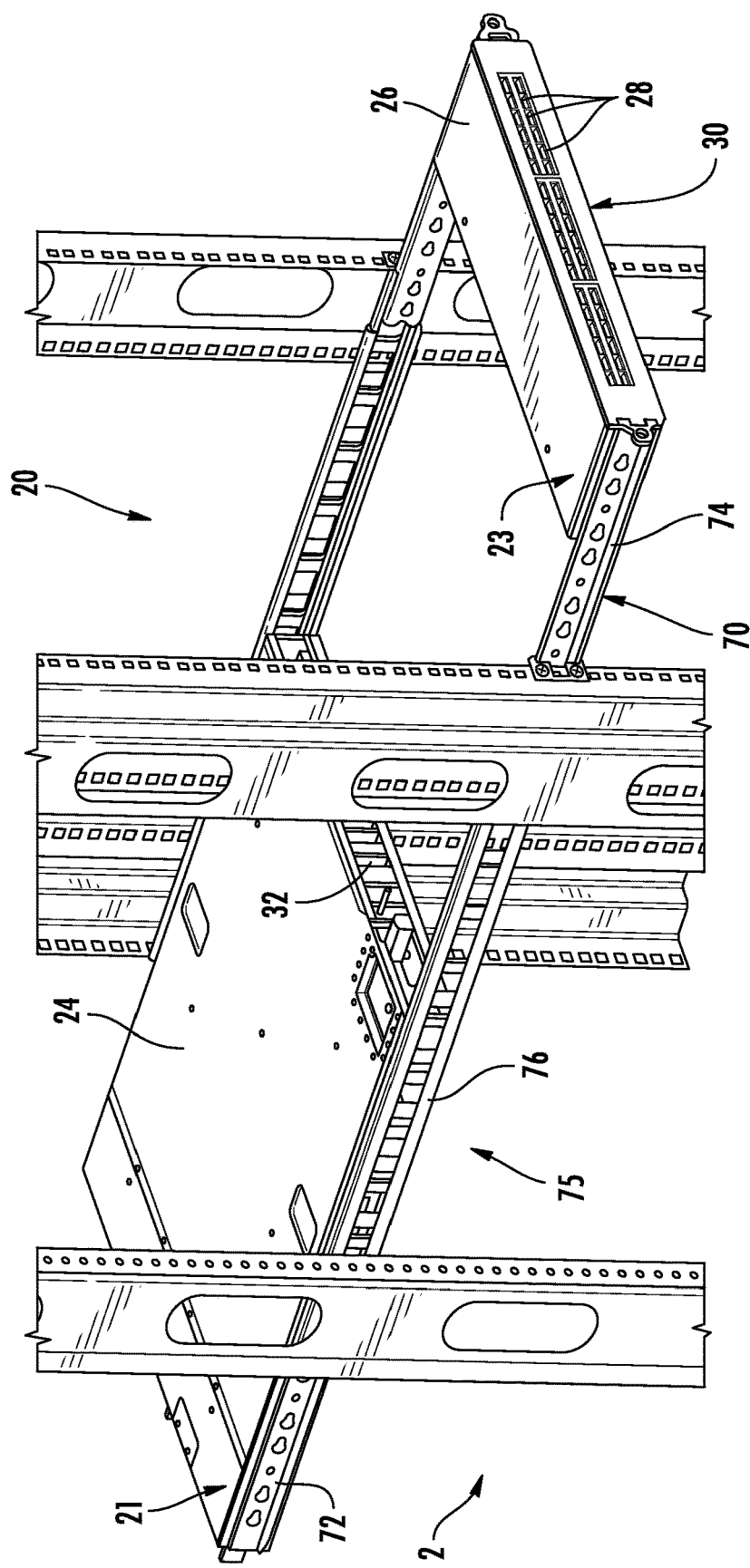
FIG. 5 is a front perspective view of a main switch box and a detachable module in the unlocked state and separated from each other according to an example embodiment.
Figure 6:
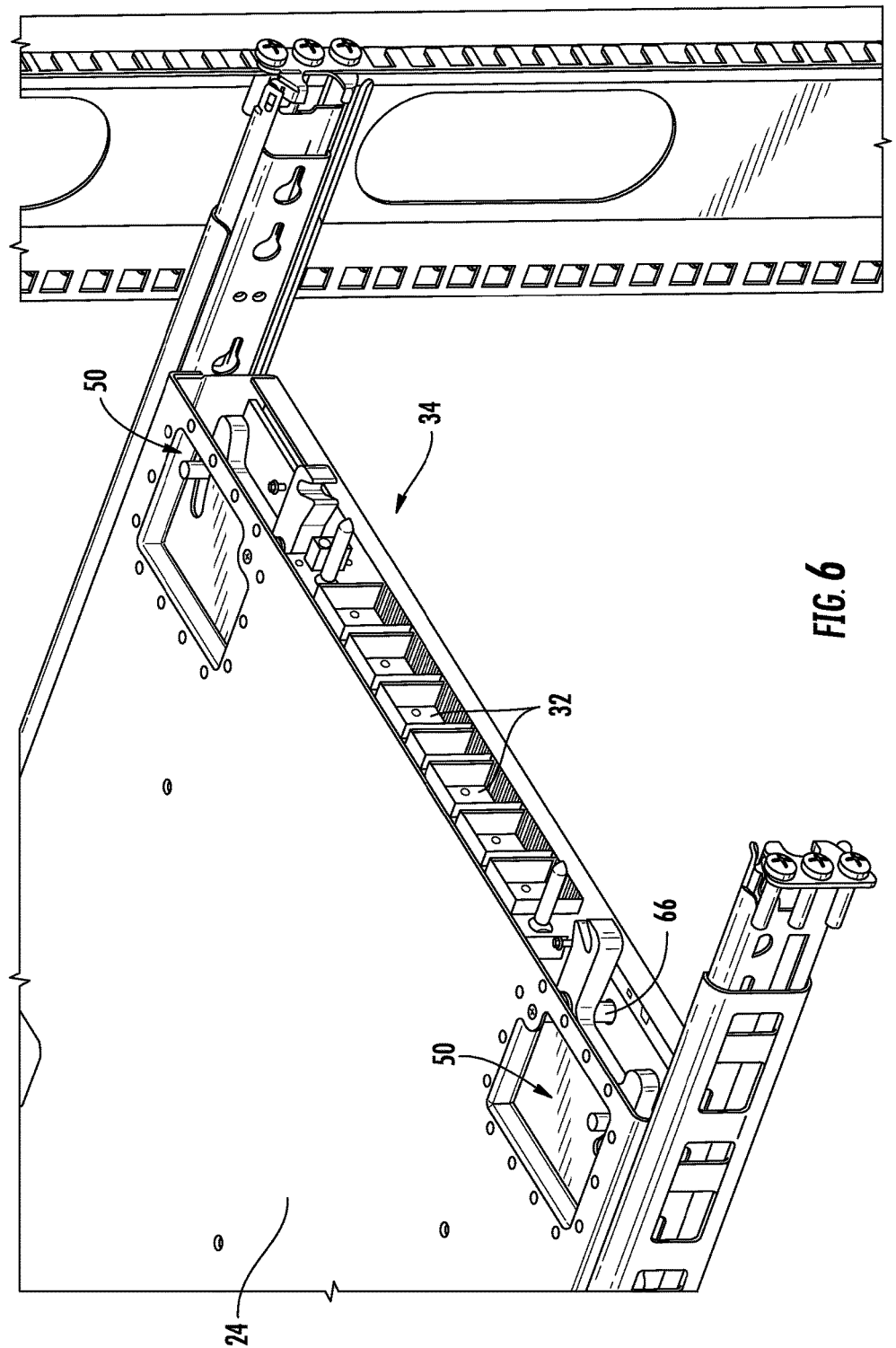
FIG. 6 is a close-up perspective view of an end of the main switch box of FIG. 5 according to an example embodiment.
Figure 7:
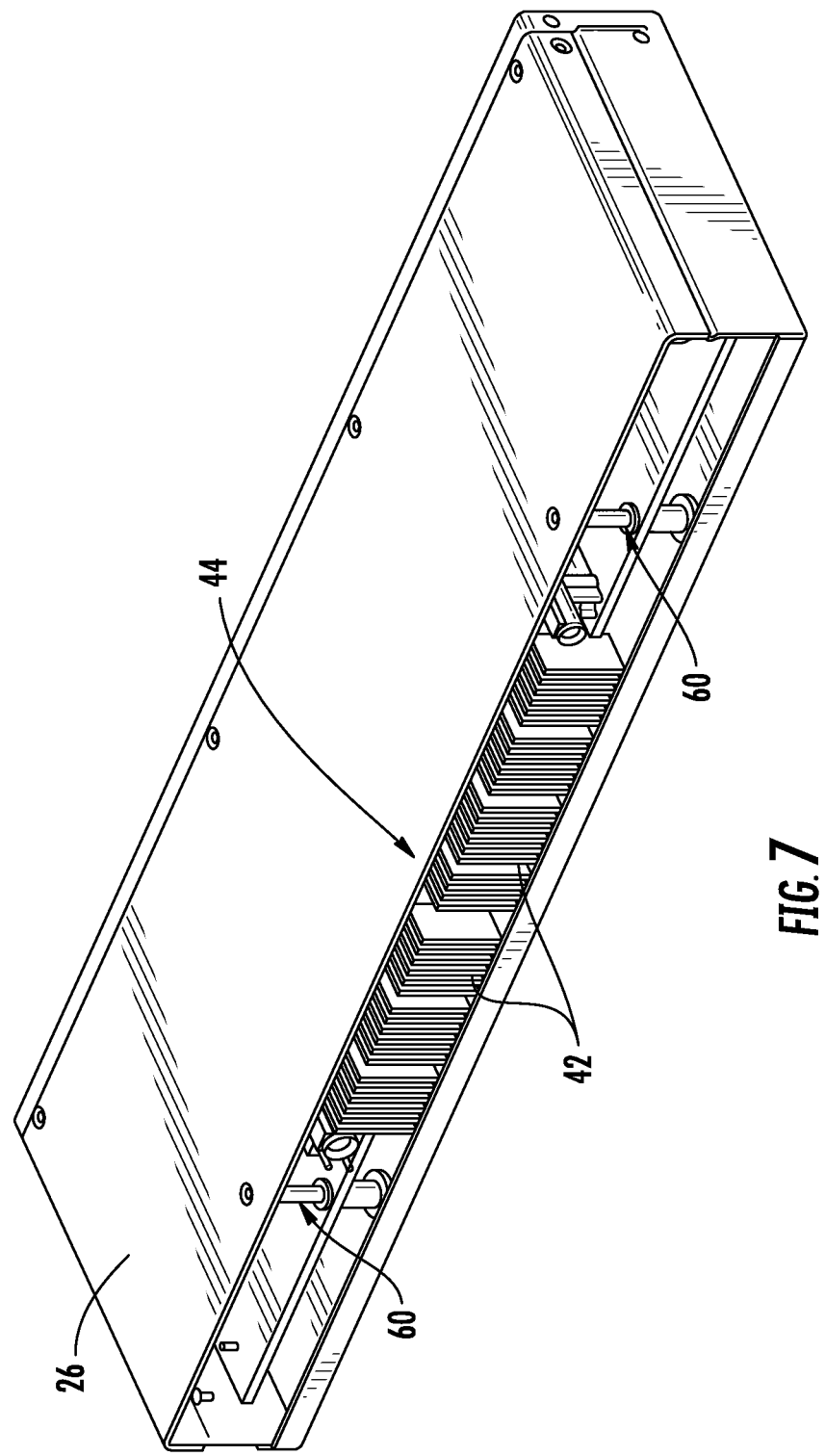
FIG. 7 is a close-up perspective view of a second end of the detachable module of FIG. 5 according to an example embodiment.

The main switch box 24 and the detachable module 26 may be configured to connect to one another to enable electrical signals to be transmitted therebetween. Turning to FIG. 5, embodiments of the main switch box 24 and the detachable module 26 are thus configured to be detached from one another and movable with respect to each other so as to allow removal of one of the main switch box or the detachable module from the datacenter rack 2 without affecting the other. Accordingly, the main switch box 24 may comprise one or more board-to-board connectors 32 disposed at an end 34 of the main switch box (shown in FIG. 6), and the detachable module 26 may comprise one or more corresponding board-to-board connectors 42 disposed at a second end 44 of the detachable module (shown in FIG. 7). The board-to-board connectors 42 of the detachable module 26 may be configured to engage the board-to-board connectors of the main switch box 24 when the main switch box and the detachable module are joined to each other (as shown in FIG. 4) to enable electrical signals to be transmitted between the detachable module and the printed circuit board assembly housed within the main switch box.

In this regard, one of the main switch box 24 and the detachable module 26 may comprise a latching mechanism, and the other of the main switch box and the detachable module may comprise an engagement member configured to be engaged by the latching mechanism. In the example depicted in the figures, the latching mechanism 50 (shown in FIG. 6) is disposed on the main switch box 24, and the engagement member 60 (shown in FIG. 7) is disposed on the detachable module 26.

Figure 8:
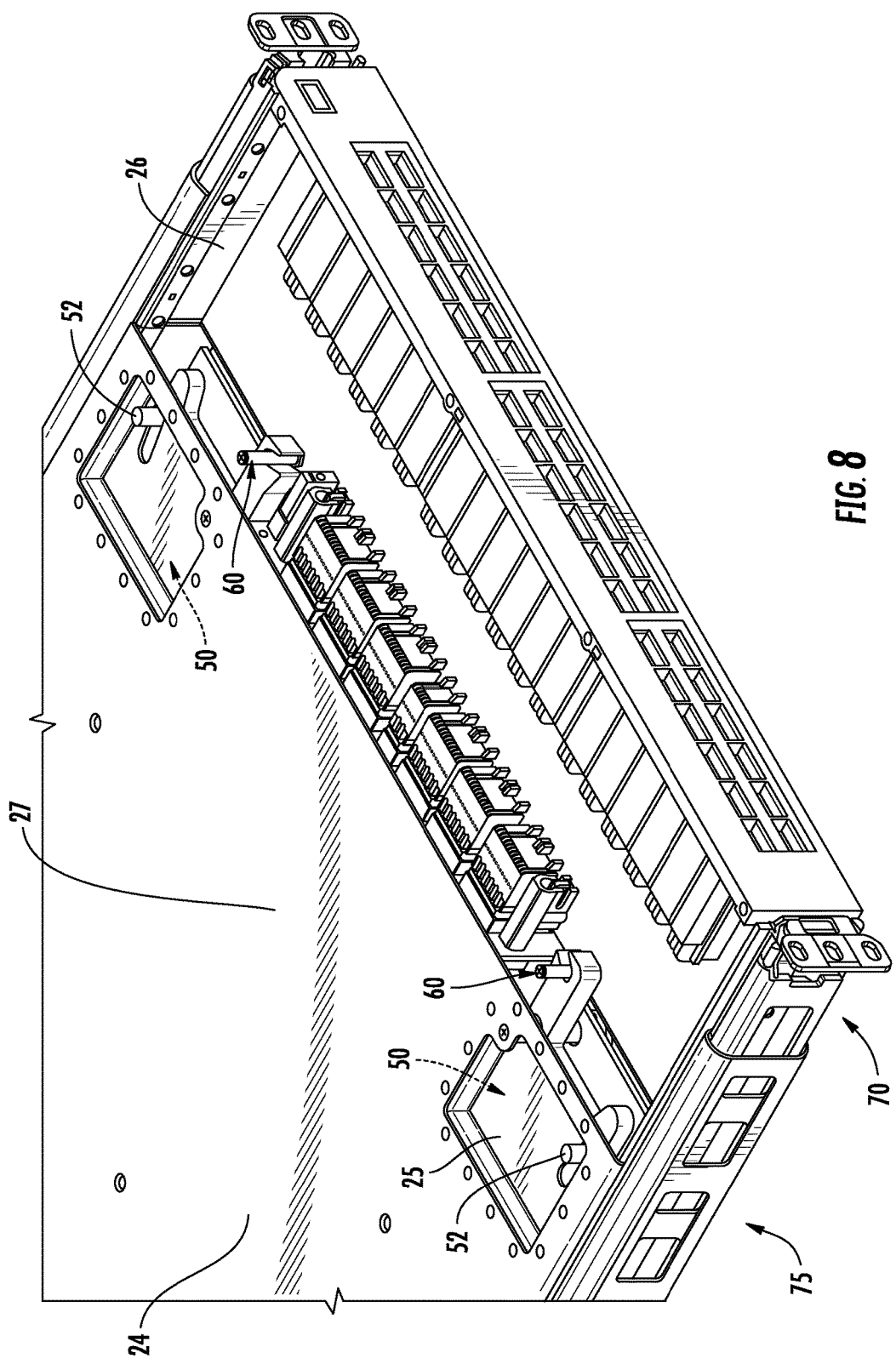
FIG. 8 illustrates a latching mechanism and engagement member in a locked state according to an example embodiment.
Figure 9:
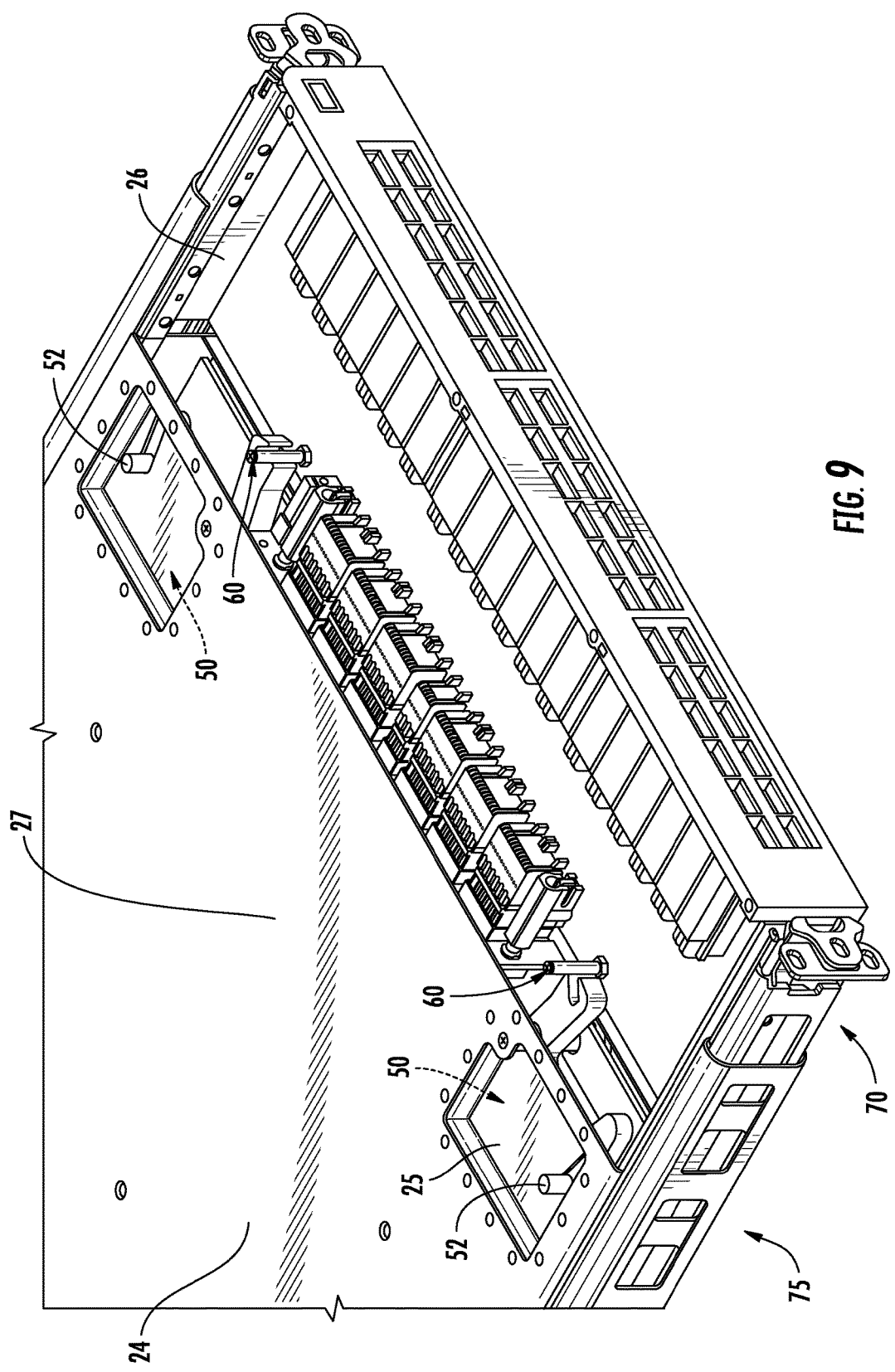
FIG. 9 illustrates the latching mechanism and engagement member in an unlocked state according to an example embodiment.

FIG. 8 shows the latching mechanism 50 and the engagement member 60 in a locked state, while FIG. 9 shows the latching mechanism 50 and the engagement member 60 in an unlocked state. In FIGS. 8 and 9, a portion of the top cover 27 of the detachable module 26 is removed for purposes of explanation.

In the locked state, such as shown in FIG. 8, the latching mechanism 50 and the engagement member 60 are engaged, and the detachable module 26 is secured to the main switch box 24, such that the board-to-board connectors 42 of the detachable module are connected to the board-to-board connectors 32 of the main switch box 24 to enable electrical signals to pass therebetween. In the unlocked state, such as shown in FIG. 9, the latching mechanism 50 and the engagement member 60 are disengaged, and the detachable module 26 and the main switch box 24 are movable with respect to each other so as to allow removal of one of the main switch box or the detachable module from the datacenter rack. Accordingly, in the unlocked state, the main switch box 24 is removable from the datacenter rack without necessitating the rewiring of the detachable module 26. The latching mechanism 50 may, in some embodiments, include an actuator 52 configured to be actuated (e.g., pushed or pulled) by a user to change between the locked state and the unlocked state, as described below.

Figure 10:
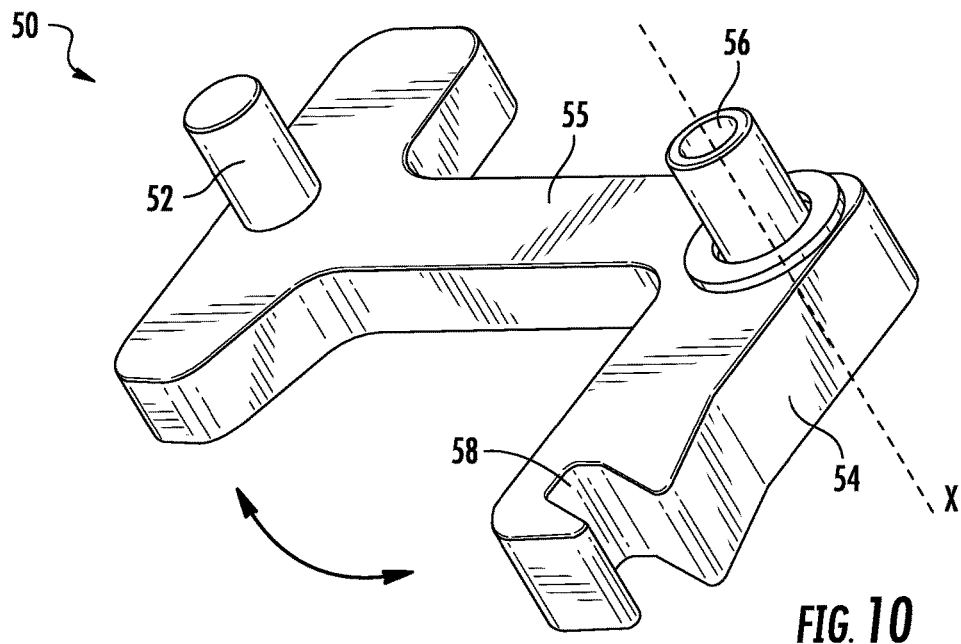
FIG. 10 is a close-up perspective view of the latching mechanism according to an example embodiment.
Figure 11:
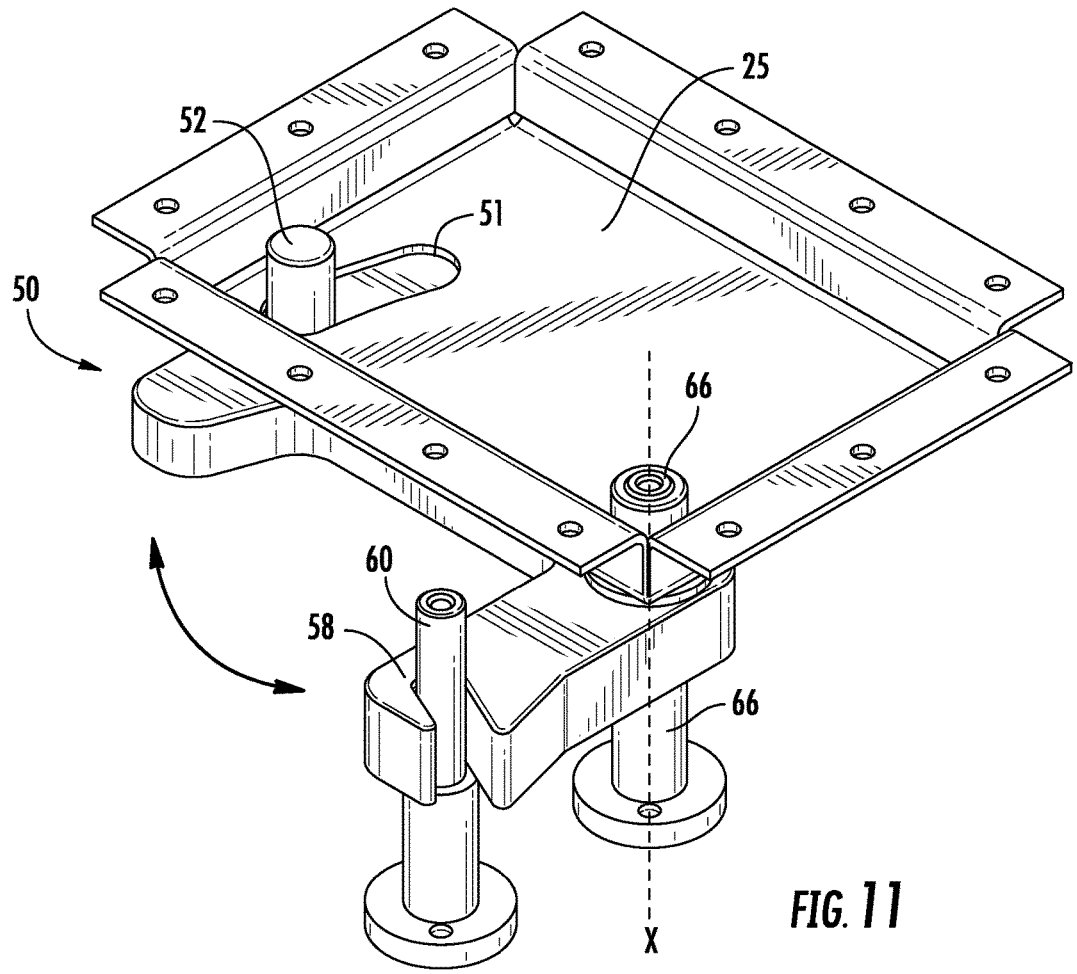
FIG. 11 is a close-up perspective view of the latching mechanism and engagement member according to an example embodiment.
Figure 12:
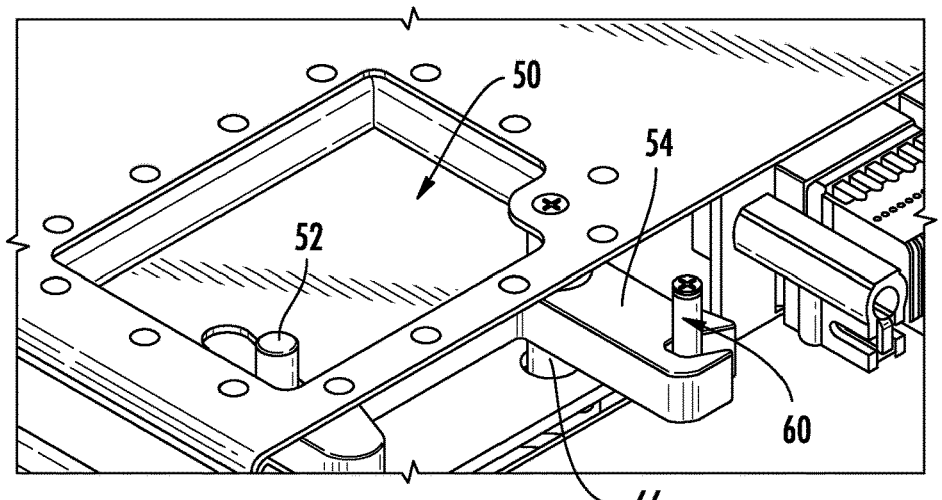
FIG. 12 illustrates a close-up view of the latching mechanism and engagement member in the locked state according to an example embodiment.
Figure 13:
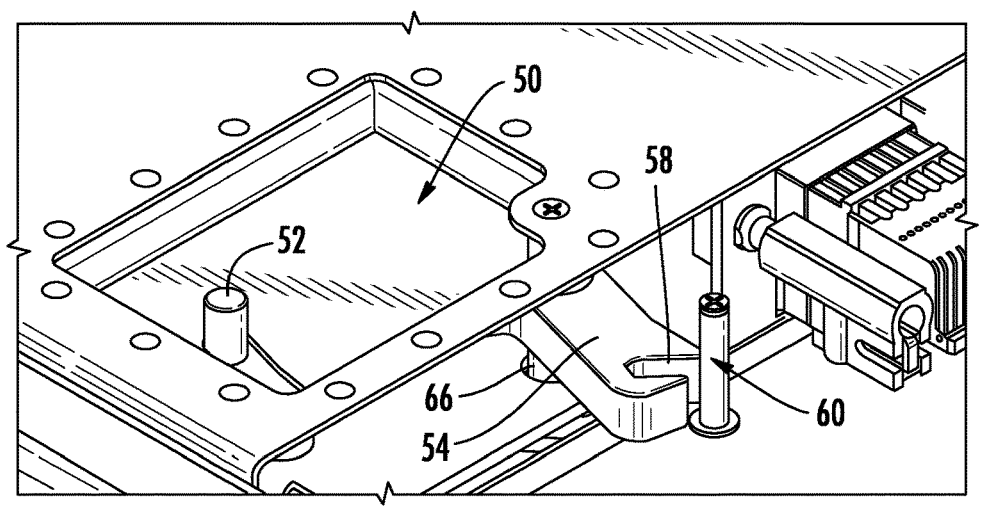
FIG. 13 illustrates a close-up view of the latching mechanism and engagement member in the unlocked state according to an example embodiment.

A close-up view of the latching mechanism 50 is shown in FIG. 10, and a close-up view of the latching mechanism 50 engaged with the engagement member 60 in the locked state is shown in FIG. 11, according to some embodiments. In the depicted example, the latching mechanism 50 comprises a latching arm 54 and an actuating arm 55. The actuator 52 may extend outwardly from the actuating arm 55, as shown. The latching mechanism 50 may define a pivot channel 56 between the latching arm 54 and the actuating arm 55, which may be configured to receive a pivot member 66 that is secured to a portion of the main switch box 24, as shown in FIGS. 11-13. The pivot channel 56 may, in turn, be received by an opening formed in the locking panel 25 that forms part of the top cover 27 of the main switch box 24 (shown in FIGS. 8, 9, and 11). Likewise, the actuator 52 may extend through a curved slot 51 (FIG. 11) of the locking panel 25 to allow the actuator to be gripped and moved by the user.

In this way, the latching arm 54 is rotatably attached to the main switch box 24, such that a user's actuation of the actuating arm 55 via the actuator 52 causes the latching mechanism 50 to rotate about an axis X of the pivot channel 56 to engage or disengage the latching mechanism 50 with respect to the engagement member 60, as shown in FIGS. 12 and 13 and described below. Moreover, in some embodiments, the latching arm 54 of the latching mechanism 50 may comprise a notch 58, shown in FIG. 10, which is configured to engage or disengage with the engagement member 60 of the detachable module, as shown in FIG. 11.

Thus, when the latching mechanism 50 is rotated by the user via actuation of the actuator 52, the latching mechanism 50 may be engaged with the engagement member 60 due to the notch 58 receiving the engagement member 60 therein, as shown in FIG. 12. In some cases, the engagement member 60 may comprise a pin attached to the detachable module 26 proximate the second end 44 of the detachable module. Because the engagement member 60 is fixedly attached to the detachable module 26, such as via fasteners, receipt of the engagement member 50 by the latching arm 54 of the latching mechanism 50 via the notch 58 in this example serves to secure the detachable module to the main switch box in the locked state, as shown in FIG. 12. Conversely, when the latching mechanism 50 is rotated by the user via actuation of the actuator 52 in an opposite direction, the latching mechanism 50 may be disengaged from the engagement member 60 as the latching arm 54 is moved away from the engagement member, thereby removing the engagement member from within the notch 58 as shown in FIG. 13.

As noted above, movement of latching mechanism 50 and the engagement member 60 from the locked state to the unlocked state according to embodiments of the invention allows the main switch box 24 to be disengaged from the detachable module 26 and removed from the switch system, and a new main switch box installed, such that the connections made via receipt of the cables 10 within the connectors 28 at the first end 30 of the detachable module need not be removed or disturbed. In cases where the detachable module 26 needs to be replaced, the detachable module may be disconnected from any cables 10, separated from the main switch box 24, and removed from the switch system 20 while leaving the main switch box installed on the rack.

For example, the detachable module 26 may be replaced in an instance in which different connectors 28 are required for providing the switch system with different data transmission and processing capabilities. In this regard, the one or more connectors 28 disposed on the first end 30 of the detachable module 26 may be configured to receive a variety of different types of transceivers and/or connections, such as QSFP, QSFP+, QSFP28, QSFP56, etc.; Quad Small Form-factor Pluggable Double Density (QSFP-DD); micro QSFP; Small Form-factor Pluggable (SFP), SFP+, SFP28, SFP56, etc.; Octal Small Form-factor Pluggable (OSFP); C Form-factor Pluggable (CFP); CXP; RCx; RJ45; optic connectors (e.g., connected to Middle Board Optic Modules (MBOMs) or to on board optic consortium (COBO)); MPO/MTP; LC-LC; MXC; as well as other existing and future form factors as applicable.

With reference to FIGS. 4 and 5, embodiments of the switch system 20 may further comprise a mechanism for allowing the main switch box 24 and the detachable module 26 to be supported within the rack 2 and at the same time independently movable with respect to each other, such that one or both components may be removed from the switch system. Accordingly, in some embodiments, each of the main switch box 24 and the detachable module 26 comprises a support feature 70 configured to mate with a corresponding support feature 75 of the datacenter rack 2, such as a rail and channel mechanism. In the depicted embodiment. For example, the support feature 70 secured to the main switch box 24 and the detachable module 26 may comprise first rail portions 72 secured to side panels 21 of the main switch box 24 and second rail portions 74 secured to side panels 23 of the detachable module 26. The first and second rail portions 72, 74 may, in turn, be received within and movable (e.g., slidable) with respect to corresponding channel guides 76 that are secured to the rack 2. Accordingly, the channel guides 76 may remain stationary, being fixed to the rack 2, whereas the first and second rail portions 72, 74 may be independently movable (e.g., in telescoping fashion) with respect to the channel guides, so as to allow the main switch box 24 (secured to the first rail portion 72) to be movable independently from the detachable module 26 (secured to the second rail portion 74).

The main switch box 24 and the detachable module 26 may be separated from the switch system 20 by withdrawing the respective component and its attached rail portion 72, 74 out of a respective end of the channel guide 76, past the point shown in FIG. 5.

Figure 14:
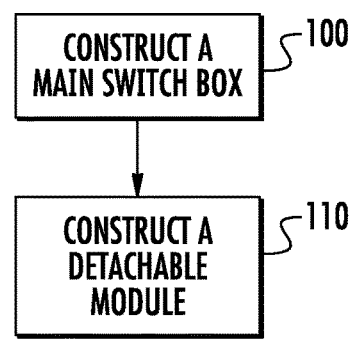
FIG. 14 is a flow chart depicting a method of assembling a switch system according to an example embodiment.

With reference now to FIG. 14, embodiments of a method of assembling a networking system, such as a switch system or a router system, configured to be received by a datacenter rack are provided. Embodiments of the method may comprise constructing a main switch box at Block 100, wherein the main switch box comprises a printed circuit board assembly disposed within the main switch box, and one or more board-to-board connectors disposed at an end of the main switch box, as described in greater detail above with reference to FIGS. 1-13. The method may also include constructing a detachable module at Block 110, wherein the detachable module comprises one or more connectors disposed at a first end of the detachable module and configured to receive an optical cable and further comprises one or more board-to-board connectors disposed at a second end of the detachable module and configured to engage the board-to-board connectors of the main switch box to enable electrical signals to be transmitted between the detachable module and the printed circuit board assembly of the main switch box.

Constructing one of the main switch box and the detachable module may further comprise providing a latching mechanism and constructing the other of the main switch box and the detachable module may further comprise providing an engagement member configured to be engaged by the latching mechanism. In a locked state, the latching mechanism and the engagement member are engaged, and the detachable module is secured to the main switch box, such that the board-to-board connectors of the detachable module are connected to the board-to-board connectors of the main switch box to enable the electrical signals to pass therebetween, as described above. In an unlocked state, the latching mechanism and the engagement member are disengaged, and the detachable module and the main switch box are movable with respect to each other, so as to allow removal of one of the main switch box or the detachable module from the datacenter rack. In the unlocked state, the main switch box may be removable from the datacenter rack without rewiring the detachable module.

Constructing the main switch box may comprises disposing the latching mechanism on the main switch box, and constructing the detachable module may comprise disposing the engagement member on the detachable module.

In some cases, each of the steps of constructing the main switch box and constructing the detachable module comprises attaching a support feature to each side panel of the main switch box and detachable module that is configured to mate with a corresponding support feature of the datacenter rack.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components (e.g., components of the respective printed circuit boards, FRUs, transceivers, cables, etc.) may also be part of the main networking box or the detachable module. In addition, although the examples provided above primarily describe a latching mechanism disposed on the main networking (e.g., switch or router) box and an engagement member disposed on the detachable module, it is understood that the latching mechanism may be disposed on the detachable module and the engagement member may be disposed on the main networking box in alternative embodiments. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in FIG. 14, and in some cases one or more of the steps depicted may occur substantially simultaneously. Although specific terms are employed herein, they are used in a generic and descriptive sense only and not for purposes of limitation.

What is claimed is:

1. A networking system configured to be received by a datacenter rack, the networking system configured to allow conversion between optical signals and electrical signals, the networking system comprising:
   a main networking box comprising:
      a printed circuit board assembly disposed within the main networking box, and one or more board-to-board connectors disposed at an end of the main networking box; and
a detachable module comprising:
one or more connectors disposed at a first end of the detachable module and configured to receive an optical cable, wherein the optical cable is configured to transmit an optical signal, and
one or more board-to-board connectors disposed at a second end of the detachable module and configured to engage the board-to-board connectors of the main networking box to enable electrical signals to be transmitted between the detachable module and the printed circuit board assembly of the main networking box;
wherein one of the main networking box and the detachable module further comprises a latching mechanism including a rotatably attached latching arm and the other of the main networking box and the detachable module further comprises an engagement member including a corresponding pin configured to be engaged by the latching mechanism such that the detachable module is secured to the main networking box in a locked state,
wherein, in the locked state in which the latching mechanism and the engagement member are engaged, the detachable module is secured to the main networking box, such that the board-to-board connectors of the detachable module are connected to the board-to-board connectors of the main networking box to enable the electrical signals to pass therebetween,
wherein, in an unlocked state, the latching mechanism and the engagement member are disengaged such that the main networking box is removable from the datacenter rack while maintaining the detachable module installed in the datacenter rack.

2. The networking system according to claim 1, wherein, in the unlocked state, the main switch box is removable from the datacenter rack without rewiring the detachable module.

3. The networking system according to claim 1, wherein the latching mechanism is disposed on the main networking box, and the engagement member is disposed on the detachable module.

4. The networking system according to claim 1, wherein the latching mechanism comprises an actuator configured to be actuated by a user to change between the locked state and the unlocked state.

5. The networking system according to claim 1, wherein the latching arm of the latching mechanism is rotatably attached to the main networking box, and wherein the pin of the engagement member is attached to the detachable module proximate the second end of the detachable module, wherein the latching arm is configured to engage the pin of the detachable module to secure the detachable module to the main networking box in the locked state.

6. The networking system according to claim 1, wherein each of the main networking box and the detachable module comprises a support feature configured to mate with a corresponding support feature of the datacenter rack.

7. The networking system according to claim 1, wherein the optical cable further comprises an active optical cable configured to convert between optical signals and electrical signals.

8. The networking system according to claim 1, wherein the one or more connectors disposed on the first end of the detachable module are configured to receive quad small form-factor pluggable (QSFP), quad small form-factor pluggable double density (QSFP-DD), micro QSFP, small form-factor pluggable (SFP), C form-factor pluggable (CFP), and/or registered jack (RJ45) active optical cable connections.

9. A method of assembling a networking system configured to be received by a datacenter rack, the networking system configured to allow conversion between optical signals and electrical signals, the method comprising:
constructing a main networking box, wherein the main networking box comprises:
a printed circuit board assembly disposed within the main networking box, and
one or more board-to-board connectors disposed at an end of the main networking box; and
constructing a detachable module, wherein the detachable module comprises:
one or more connectors disposed at a first end of the detachable module and configured to receive an optical cable, wherein the optical cable is configured to transmit an optical signal, and
one or more board-to-board connectors disposed at a second end of the detachable module and configured to engage the board-to-board connectors of the main networking box to enable electrical signals to be transmitted between the detachable module and the printed circuit board assembly of the main networking box;
wherein constructing one of the main networking box and the detachable module further comprises providing a latching mechanism including a rotatably attached latching arm and constructing the other of the main networking box and the detachable module further comprises providing an engagement member including a corresponding pin configured to be engaged by the latching mechanism such that the detachable module is secured to the main networking box in a locked state,
wherein, in the locked state in which the latching mechanism and the engagement member are engaged, the detachable module is secured to the main networking box, such that the board-to-board connectors of the detachable module are connected to the board-to-board connectors of the main networking box to enable the electrical signals to pass therebetween,
wherein, in an unlocked state, the latching mechanism and the engagement member are disengaged such that the main networking box is removable from the datacenter rack while maintaining the detachable module installed in the datacenter rack.

10. The method according to claim 9, wherein, in the unlocked state, the main networking box is removable from the datacenter rack without rewiring the detachable module.

11. The method according to claim 9, wherein constructing the main networking box comprises disposing the latching mechanism on the main networking box, and wherein constructing the detachable module comprises disposing the engagement member on the detachable module.

12. The method according to claim 9, wherein the latching mechanism comprises an actuator configured to be actuated by a user to change between the locked state and the unlocked state.

13. The method according to claim 9, wherein the latching arm of the latching mechanism is rotatably attached to the main networking box, and wherein the pin of the engagement member is attached to the detachable module proximate the second end of the detachable module, wherein the latching arm is configured to engage the pin of the detachable module to secure the detachable module to the main networking box in the locked state.

14. The method according to claim 9, wherein each of constructing the main networking box and constructing the detachable module comprises attaching a support feature to each side panel of the main networking box and detachable module configured to mate with a corresponding support feature of the datacenter rack.

15. The method according to claim 9, wherein the optical cable further comprises an active optical cable configured to convert between optical signals and electrical signals.

16. The method according to claim 9, wherein the one or more connectors disposed on the first end of the detachable module are configured to receive quad small form-factor pluggable (QSFP), quad small form-factor pluggable double density (QSFP-DD), micro QSFP, small form-factor pluggable (SFP), C form-factor pluggable (CFP), and/or registered jack (RJ45) active optical cable connections.

17. A networking system configured to be received by a datacenter rack, the networking system configured to allow conversion between optical signals and electrical signals, the networking system comprising:
   a main networking box comprising:
      a printed circuit board assembly disposed within the main networking box, and
      one or more board-to-board connectors disposed at an end of the main networking box; and
   a detachable module comprising:
      one or more connectors disposed at a first end of the detachable module and configured to receive an optical cable, wherein the optical cable is configured to transmit an optical signal, and
      one or more board-to-board connectors disposed at a second end of the detachable module and configured to engage the board-to-board connectors of the main networking box to enable electrical signals to be transmitted between the detachable module and the printed circuit board assembly of the main networking box;
   wherein the main networking box comprises a latching mechanism that includes a latching arm and the detachable module comprises an engagement member defined by a pin,
   wherein the latching arm of the latching mechanism of the main networking box is configured to be moved into engagement with the pin of the detachable module to secure the detachable module to the main networking box, thereby connecting the board-to-board connectors of the detachable module to the board-to-board connectors of the main networking box to enable the electrical signals to pass therebetween, and
   wherein the latching arm of the latching mechanism of the main networking box is configured to be moved out of engagement with the pin of the detachable module to allow the main networking box to be separated from the detachable module and removed from the datacenter rack while maintaining the detachable module installed in the datacenter rack.

18. The system according to claim 17, wherein the latching mechanism comprises an actuator configured to be actuated by a user to move the latching arm into and out of engagement with the pin.

19. The system according to claim 17, wherein each of the main networking box and the detachable module comprises a support feature configured to mate with a corresponding support feature of the datacenter rack.

20. The system according to claim 19, wherein the support feature of the main networking box and the detachable module comprises first and second rail portions and the corresponding support feature of the datacenter rack comprises a channel guide configured to slideably receive the first and second rail portions therein.

* * * * *